W. W. CHAPMAN.
Cotton-Planter.

No. 206,772. Patented Aug. 6, 1878.

Attest.
John H Cassin
G. L. Ennis

Inventor.
William W. Chapman

N. PETERS, PHOTO-LITHOGRAPHER, WASHINGTON, D. C.

UNITED STATES PATENT OFFICE.

WILLIAM W. CHAPMAN, OF WASHINGTON, DISTRICT OF COLUMBIA.

IMPROVEMENT IN COTTON-PLANTERS.

Specification forming part of Letters Patent No. 206,772, dated August 6, 1878; application filed July 2, 1878.

*To all whom it may concern:*

Be it known that I, WILLIAM W. CHAPMAN, of Washington, District of Columbia, have invented a new and useful Improvement in a Machine for Planting Cotton, as seen by the following description.

The object of my invention is to provide a mode by which cotton-seed may be planted in hills, instead of being sown, as heretofore, in drills. As the cotton-plants are cultivated in hills, it becomes necessary, after the plants are up, to chop out with a hoe all the superfluous plants between the hills, which is attended with much labor and expense.

Figure 1:
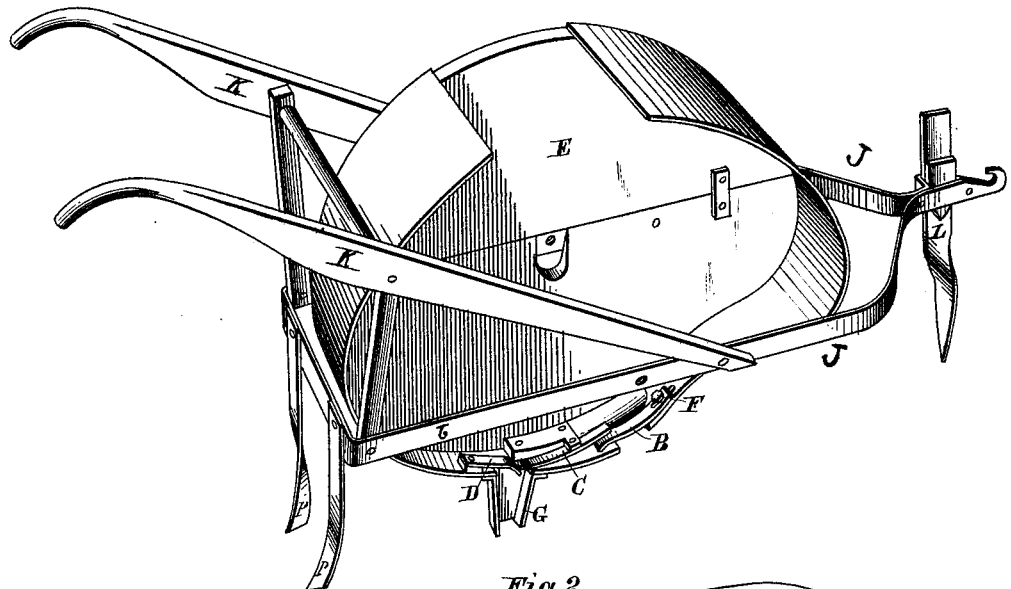
Figure 2:
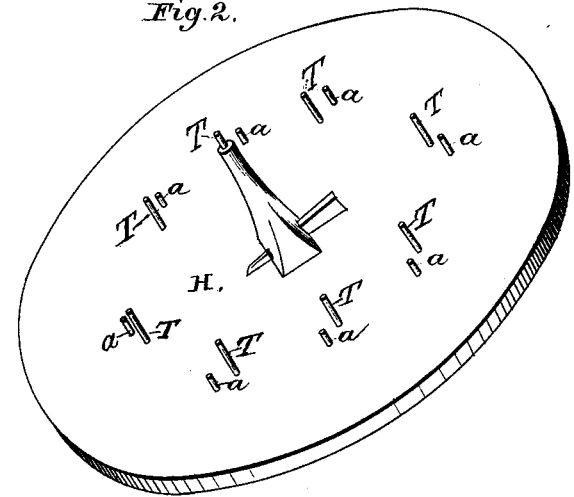

Figure 1 is a side view of my planter. Fig. 2 is a face view of the wheel.

J represents the frame, which is provided with handles K, a furrow-opener, L, in front, and seed-coverers P in the rear. The wheel H is supplied with teeth T. In respect to these parts of the machine I claim nothing new.

My invention consists in the arrangement of three springs, B, C, and D, in the bottom of the hopper E, and eight feeders, a, in the side of the wheel H, as shown in the accompanying drawing.

In revolving the wheel H, the feeders a pass successively between the regulating-spring B and the clearing-spring C, carrying the seed before them until they (the seed) are stopped by the check-spring D, which performs the double part of preventing the seed being returned to the hopper E and of holding them in position until the clearing-spring C, being released from feeder a, drops them through the conductor G into the hill.

The regulating-spring B is held in place by screw F, which works in the usual manner, and by moving the regulating-spring B up or down by means of screw F a greater or less quantity of seed is dropped, at pleasure.

What I claim is—

The combination of springs B, C, and D in the bottom of hopper E and feeders a in wheel H, substantially as set forth.

WILLIAM W. CHAPMAN.

Attest:
 JOHN H. CASSIN,
 G. J. ENNIS.